United States Patent [19]

Kirschner et al.

[11] 4,253,157
[45] Feb. 24, 1981

[54] DATA ACCESS SYSTEM WHEREIN SUBSCRIBER TERMINALS GAIN ACCESS TO A DATA BANK BY TELEPHONE LINES

[75] Inventors: Wallace Kirschner, Trumbull; Lawrence M. Haskel, Danbury, both of Conn.

[73] Assignee: Alpex Computer Corp., Danbury, Conn.

[21] Appl. No.: 947,699

[22] Filed: Sep. 29, 1978

[51] Int. Cl.³ .................. G06F 3/04; G06F 3/153
[52] U.S. Cl. .................. 364/900; 179/2 DP
[58] Field of Search .......... 364/200 MS, 900 MS; 179/2 CA, 2 DP, 18 BH, 18 DA; 340/152 R, 152 T, 153, 154

[56] References Cited

U.S. PATENT DOCUMENTS

| Re. 29,884 | 1/1979 | Komine et al. | 179/2 DP |
|---|---|---|---|
| 4,001,507 | 1/1977 | Bonk et al. | 179/2 DP |
| 4,107,467 | 8/1978 | Johnson et al. | 179/2 DP |
| 4,146,746 | 3/1979 | de Crepy et al. | 179/18 DA |
| 4,150,254 | 4/1975 | Schüsler | 179/2 DP X |

*Primary Examiner*—Harvey E. Springborn
*Attorney, Agent, or Firm*—Darby & Darby

[57] ABSTRACT

A data access system comprises a plurality of intelligent terminals capable of selectively receiving data from a data bank by means of barge-in telephone lines. Each terminal includes a basic terminal into which application modules and device control modules may be plugged. The application modules contain programs enabling the computer to perform specified functions in conjunction with certain stored subroutines within the basic terminal. A device control module enables communication by telephone with the data bank. A terminal subscribes to the data bank by transferring selectively subscription data to memory within the terminal. In one embodiment, subscription data identifying by serial numbers the terminals which are to become subscribers is circulated on subscription barge-in telephone lines. If a terminal calls a subscription line on which there appears the serial number for that terminal, the subscription data for that terminal is permanently stored within the application module of the terminal. The text data to which the terminal has subscribed is retrieved from the data bank by calling a barge-in telephone line (on which such data is circulated) if the stored subscription data shows that the subscription is in effect.

10 Claims, 7 Drawing Figures

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| STX | C∅ | N | Y | ⓑ | T | I | M | E | S | CC | O | 1 | 1 | 5 | 7 | 8 | ⓑ | ⓑ | 1 |

↑ START OF BLOCK / MAG. DATA  
←——— MAG. NAME ———→ ↑ END OF MAG. NAME  
←——— CURRENT DATA ———→

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| 2 | : | 0 | 5 | P | M | CD | 1 | 2 | C | O | N | F | U | S | I | O | N | ⓑ | ⓑ |

↑ TIME TEXT ENTERED  ↑ END OF HEADER  ↑ CURRENT VOL. NO.  ↑ NEXT VOL. NO.  
←——— TEXT ———→

| 40 | 41 | 42 | 43 | ... | 52 | 53 | 54 | ... | 58 | 59 |
|---|---|---|---|---|---|---|---|---|---|---|
| N | ⓑ | W | A | | ETX | EOT | | | | |

↑ END OF TAPE  ↑ END OF TAPE

| 60 | 61 | 62 | 63 | 64 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|---|---|---|
| L | I | N | E | ⓑ | I | N | ⓑ | P | R | I | C | E | S | ) | C | A | R | | M |

←——— CURRENT VOL. NO. ———→

| 220 | 221 | 222 | 223 | 224 | 225 | 226 | 227 | 228 | 229 | 230 | 231 | 232 | 233 | 234 | 235 | 236 | 237 | 238 | 239 |
|---|---|---|---|---|---|---|---|---|---|---|---|---|---|---|---|---|---|---|---|
| E | X | C | E | P | T | ⓑ | F | O | R | D | ETX | STX | C∅ | S | P | O | R | T | S |

↑ END OF TEXT  ↑ START OF BLOCK  ↑ MAG. DATA

| 240 | 241 | 242 | 243 | 244 | 245 | 246 | 247 | 248 | 249 | 250 | 251 | 252 | 253 | 254 | 255 | 256 | 257 | 258 | 259 |
|---|---|---|---|---|---|---|---|---|---|---|---|---|---|---|---|---|---|---|---|
| ⓑ | W | K | L | Y | CC | O | 1 | 1 | 5 | 7 | X | ⓑ | ⓑ | 1 | 0 | : | 1 | 5 | A |

FIG. 7

| # | Addr | Section | Region |
|---|------|---------|--------|
| 0–7 | 0000 | BASIC TERMINAL | |
| 8–11 | 2000 | SLOT 1 | ROM |
| 12–15 | 3000 | SLOT 2 | ROM |
| 16–19 | 4000 | SLOT 3 | ROM |
| 20–23 | 5000 | SLOT 4 | ROM |
| 24–25 | 6000 | SLOT 1A | EAROM OR RAM |
| 26–27 | 6800 | SLOT 2A | EAROM OR RAM |
| 28–29 | 7000 | SLOT 3A | EAROM OR RAM |
| 30–31 | 7800 | SLOT 4A | EAROM OR RAM |
| 32–33 | 8000 | RES | |
| 34–35 | 8800 | RES | |
| 36–37 | 9000 | RES | |
| 38–39 | 9800 | PRINTER | |
| 40–41 | A000 | CASSETTE | |
| 42–43 | A800 | COMM | |
| 44–45 | B000 | RES | |
| 46–47 | B800 | DRAM SCRATCH RAM | IN BASIC TERMINAL |
| 48–49 | C000 | 32 x 8 SERIAL NO. | IN BASIC TERMINAL |

DATA ACCESS SYSTEM WHEREIN SUBSCRIBER TERMINALS GAIN ACCESS TO A DATA BANK BY TELEPHONE LINES

This invention relates to data access systems using intelligent terminals or home computers, as they are sometimes called. More particularly, this invention pertains to a data access system wherein one or more of a large number of intelligent terminals may have rapid and selective access to a large library of information within a data bank.

The recent proliferation of sophisticated microprocessors has resulted in the development of inexpensive computer systems available to the population at large. This, in turn, has enabled the public to gain access to vast libraries of data of assorted types. For example, information regarding the credit status of any of a large number of credit card customers can be retrieved from a data bank which is continuously updated. Likewise, such systems are used currently to provide information regarding airline tickets, hotel reservations, etc. There currently exist data banks for retrieving previously published newspaper and magazine articles, and data banks which provide stock market quotations for selected stocks.

In most cases the data is displayed at terminals which are remote from the data bank and, for obvious reasons, it is highly desirable to be able to connect the individual terminals to the data banks by standard telephone lines. This in itself can be readily achieved, but there is a problem in providing a large number of subscriber terminals access by telephone lines to a single data bank. Today, it is common to use time sharing techniques to provide access to a data bank, but this is expensive because of the large amount of equipment which is required, and problems can arise causing excessive delay if too many subscribers attempt to access the data bank at one time.

The object of the present invention is to provide a system of the type described wherein a large number of subscribers have rapid access to a data bank at substantially less expense than currently available time-sharing systems.

Another object is to provide a data access system using telephone lines to obtain information from a data bank wherein the increase in number of telephone lines, as the number of users increases, is less than in a two-way telephone communication system.

A more specific object is to enable a large number of terminals to gain access to a data bank by direct distance dialing on existing telephone lines without the need for direct lines as frequently required in existing time-sharing systems.

Briefly, in accordance with the invention, the data bank provides data in the form of a closed loop file which is applied to any of a number of barge-in telephone lines. A user becomes a subscriber to the data bank by transferring into permanent storage at that user's terminal subscription data containing various identifier codes. Thereafter, the subscriber can retrieve selected text data by dialing a special barge-in telephone line on which the desired text data is circulated. If the user has properly subscribed to that data, the text is then displayed at the user's terminal.

The invention is described in detail below with reference to the annexed drawings wherein.

Figure 1:
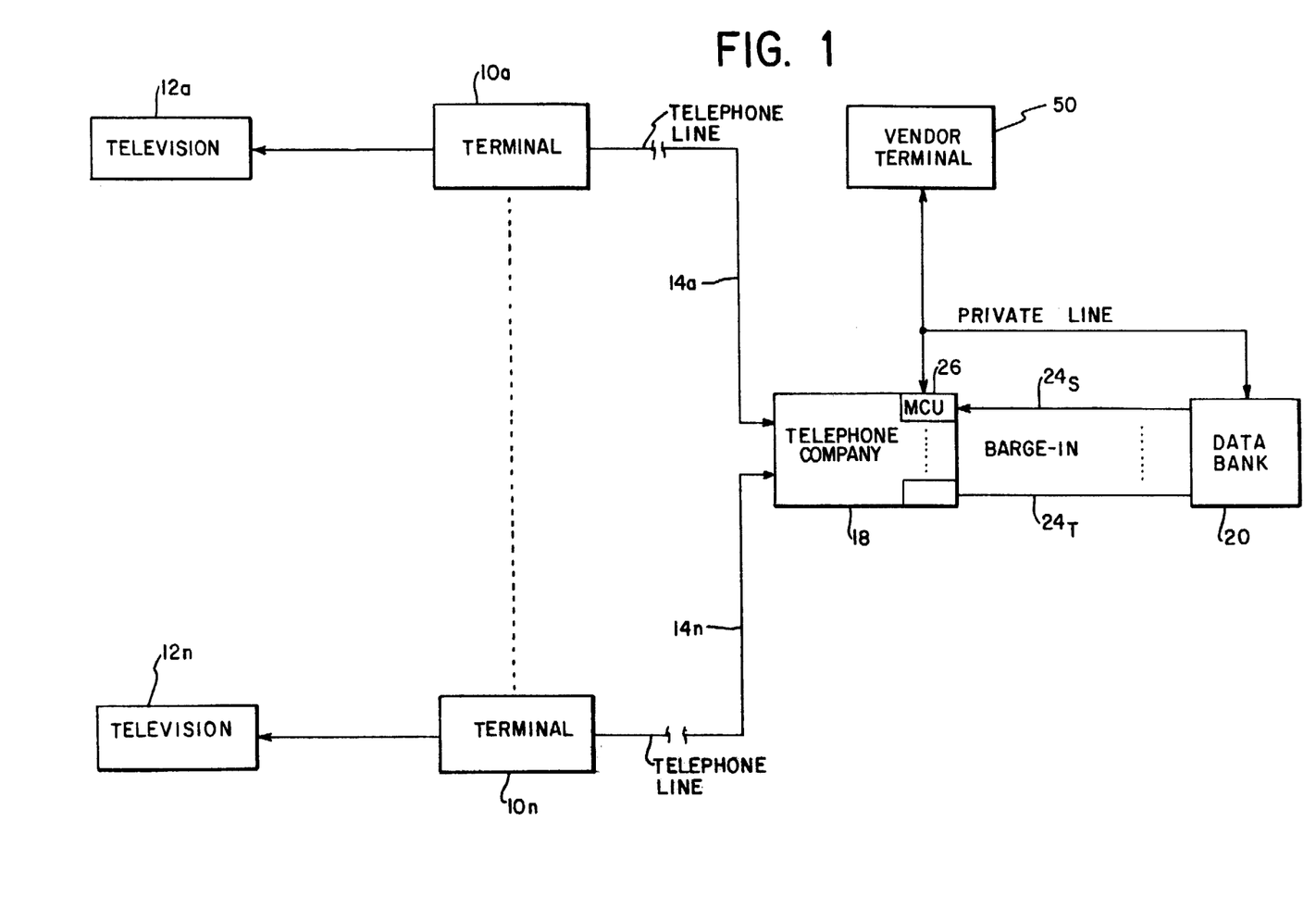
FIG. 1 is a diagrammatic illustration of the overall system.

FIG. 1 shows diagrammatically a data access system in accordance with the invention. Each subscriber has a terminal 10a-10n which is connected to a television receiver 12a-12n, respectively. These terminals are connected by standard telephone lines 14a-14n to the telephone company switching circuits 18.

The data which is to be selectively coupled to the terminals 10 for display on the receivers 12 is contained within a data bank 20. Typically, the data bank 20 may comprise a large computer installation capable of generating on a continuous basis all of the data to which the terminals may wish to subscribe. The data bank 20 may include standard private lines 22 which can be used for the purpose of updating the stored subscription data within the bank. Additionally, and pursuant to the invention, the data bank also is coupled to a series of barge-in telephone lines 24 which are coupled to respective mass calling units 26 within the telephone company switching circuitry 18.

Each barge-in line 24 is analogous to a so-called "party line" and may be connected to any one (or more) of many telephone users when a user dials the phone number of the barge-in line. The mass calling units 26 are telephone circuits which permit a large number of lines to call a selected barge-in line at one time. In this way, any user who dials a selected barge-in line will have access to the data on that line even if one or more other subscribers is receiving data from that line.

The subscription data may be received from the data bank or, alternatively, from barge-in lines 24S and is used to enable the terminals to subscribe selectively to any of the various services offered by the data bank 20. After subscribing, the text data for a selected service appears on one of the barge-in lines 24T so that the subscription data can be transferred from the data bank 20 to the proper subscribing terminals 10a-10n.

The operation of the system is described below by reference to an example. At each terminal, the subscriber operates a keyboard to input data into the system and each terminal includes a serial number which is unique to that terminal and which in effect enables the terminal to operate within the overall system.

As explained in further detail below in connection with FIG. 2, each of the terminals may include a number of different application modules and device control modules. The application modules enable certain types of applications. For example, a "magazine" module may provide the subscriber with the capability of subscribing to data from a number of publications. A "stock" module may provide the capability of receiving quotations on stock prices. In addition to the application modules, a device control module is plugged into the terminal to enable telephone communication with the data bank.

After the appropriate application and device control modules have been plugged into the subscriber's terminal, the subscriber may select any one of the applications. For example, if the user wishes to subscribe to one of the publications for which text data is stored in the data bank, he selects the magazine module and then calls one of the barge-in lines on which there appears a listing of all of the publications to which he may subscribe. If the user decides to subscribe to one of these publications, he notifies the data bank (by mail or telephone) so that he may then subscribe to the selected publication(s) by having the appropriate subscription data transferred into the memory of his terminal as described below. This subscription data will include the serial number of the user's terminal, the name of the magazine to which he has subscribed, and the expiration data of his subscription.

The subscription data may be transferred from the data bank when it is called by a new subscriber. It is also contemplated, as an alternative arrangement, that the subscription data (and the subscription data for other new subscribers) may be continuously circulated in the form of a closed loop file on the subscription barge-in line 24S. When the user calls that subscription line, his terminal will recognize his serial number (when it appears) and then transfer the subscription data into the application module of his terminal. Because the subscription data appears on a barge-in line, many potential subscribers can call the same subscription line at the same time but, because of the unique identifying serial numbers, only the subscription data specifically intended for any individual subscriber will be transferred into his terminal 10.

After the subscription data has been stored in a subscriber terminal 10, the subscriber may obtain the desired text data by dialing the telephone number of the barge-in line on which that text data has been placed by the data bank 20. Here again, because of the use of barge-in lines, many subscribers (e.g., thousands) may obtain access to the information at one time. If, for reasons of practicality, a single barge-in line contains data corresponding to magazines other than the ones to which the user has subscribed, the subscriber's terminal will nevertheless accept only the data to which he has already subscribed.

Figure 2:
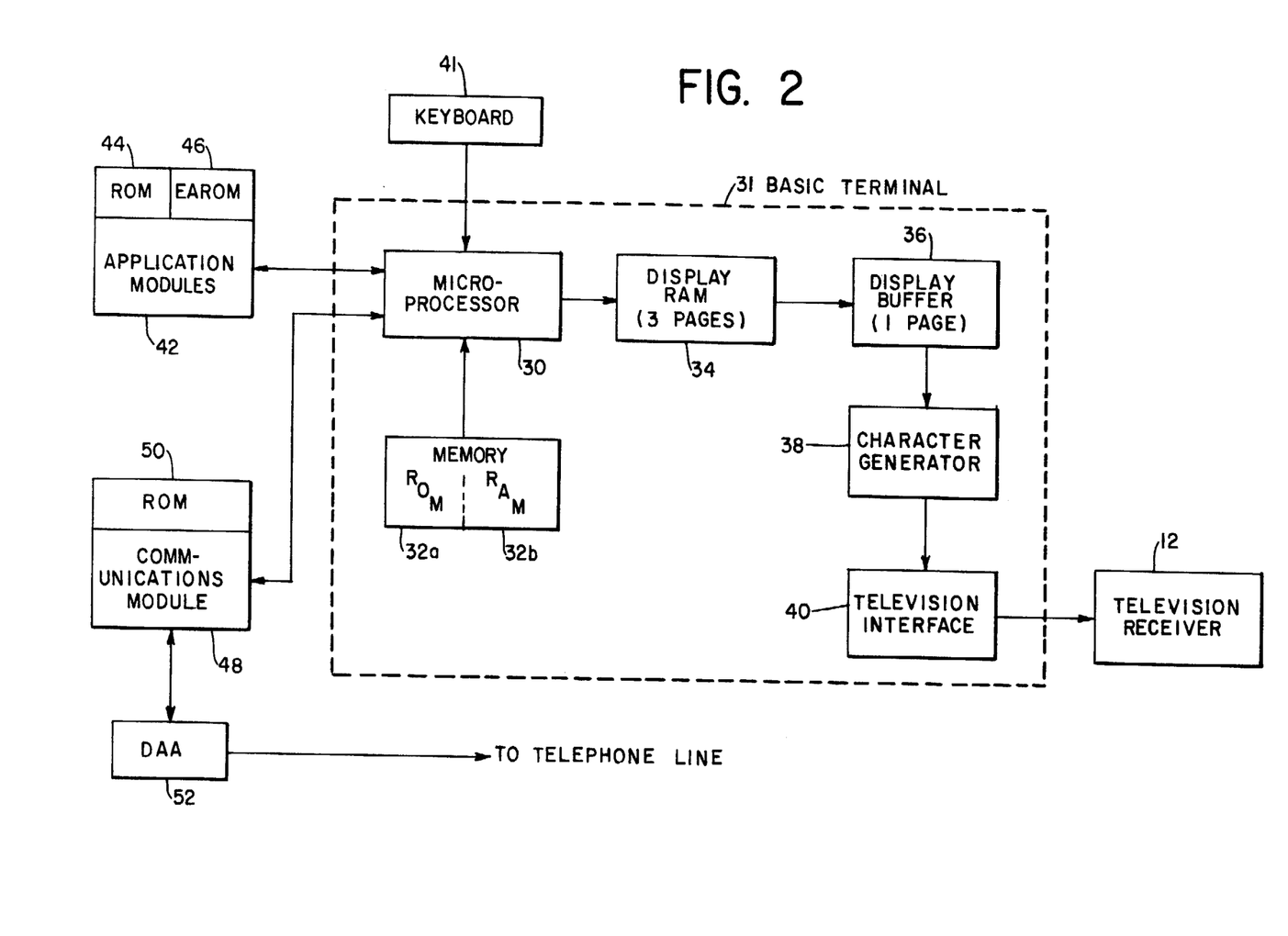
FIG. 2 is a block diagram of a preferred embodiment of a user's terminal.

The construction of the terminal 10 is shown diagrammatically in FIG. 2. The heart of the system is a microprocessor 30 (for example Intel Model No. 8080A) contained within a basic terminal 31. The microprocessor includes a memory 32 which contains a read only memory (ROM) 32a and a random access memory (RAM) 32b. The data to be displayed generally is fed first to a display RAM 34, and then to a display buffer 36. The display buffer 36 controls a standard character generator 38 which cooperates with a conventional television interface 40 to generate video signals which may be coupled to the television receiver 12.

In the preferred embodiment, the display comprises eighteen lines of thirty-three characters. The characters may be alphanumeric or symbols. Typically, each character may be represented by a 6×11 matrix as is conventional. A single "page" may thus include 594 (18×33) characters. The display buffer 36 stores a single page of information whereas the display RAM 34 stores three pages of information. In both cases, the data is stored as an eight bit code, the first six bits representing the character code in six bit ASCII and the last two bits representing the color of the character to be displayed.

Generally, when the system is used to display subscription data received on the telephone lines, the data is coupled first to the display RAM 34 and then to the display buffer 36; however, display buffer 36 may also receive display data directly from the microprocessor memory 32, from the incoming telephone line, or from the memory within the application module.

The operation of the terminal is controlled by means of a keyboard 41 which contains keys corresponding to the characters to be displayed and keys for initiating the various functions of the system as will become more apparent below.

The ability to perform specific functions is provided by application modules such as module 42 which is physically and electrically connected to the basic terminal 31 as a plug-in unit. The application module 42 includes, among other things, a ROM 44 and an electrically alterable ROM (EAROM) 46 in which are contained program instructions and subscription data to enable operation of the system.

A device control (communications) module 48, which includes a ROM 50 containing program instructions, provides the capability of communication with various different types of input/output devices, in this particular case, conventional telephone lines. As is standard, such access may be provided by means of a data access arrangement (DAA) device 52, which is a commercially available device enabling telephone communication with computers.

The basic terminal 31 may receive many separate modules. If, as in the case of the invention, it is desired to communicate by telephone line, it is necessary that there be at least one telephone communications module 48. The other modules may be for different types of applications although generally only one application module at a time would be used.

Each application module 42 contains specific programs which enable the computer to perform a particular function in conjunction with certain basic programs stored within the ROM 32a of the basic terminal 31. An important function of the basic terminal is to generate the desired displays when the stored DISPLAY subroutine of the basic terminal is called for by one of the application programs within a selected module. The basic terminal program will also include INITIALIZATION subroutines and INDEX subroutines (among others) which are likely to be called by all modules or which identify the application modules plugged into the terminal.

The "vendor" (in the example, the magazines to which the terminals subscribe) should have the capability of continuously updating the closed loop files which the data bank applies to the text barge-in lines 24T. For this purpose, each of the vendors may be provided with a basic terminal and a special "vendor" module 50. In this case, the vendor module may provide access to the data bank through the private line 22 (see FIG. 1) for the purpose of updating the stored data within the data bank.

DETAILED EXPLANATION

The invention is explained in detail below by continuing the reference to an example wherein subscribers may receive data from publications over a telephone line. For purposes of explanation, the system is described with reference to an arrangement whereby subscription data is received from the barge-in lines 24S although such data may also be selectively retrieved directly from the data bank itself.

In describing the invention, the general instructions of the programs for both the basic terminal and magazine (application) module are described. The programs required for this example are set forth in full in Appendices I, Ii and III submitted with this application but which have not been printed.

Assuming that the magazine module and communication module have been plugged into the basic terminal 31 and power turned on, the user may first press the RESET button on the keyboard 41. This causes the program in the basic terminal 31 to check for the modules and to display a list of the modules which are available. For example, the following display may appear on the television receiver.

| ALPEX 900 PERSONAL COMPUTER MENU | |
|---|---|
| CODE | APPLICATION |
| 1 | TEST DISPLAY |
| 2 | USE THE KEYBOARD |
| 7 | MAGAZINE MODULE |
| PRESS KEY FOR CODE SELECTION | |
| DISPLAY NO. 1 | |
| (Available Applications) | |

The basic terminal program for this display includes certain INITIALIZATION subroutines which clear the display RAM 34 and the display buffer 36 among other things. In addition, the INITIALIZATION subroutine calls for an INDEX subroutine which searches for the modules inserted into the basic terminal 31 and then calls a DISPLAY subroutine to display the titles of the inserted modules and to request selection of the desired application.

The user may now select a desired application by pressing the key corresponding to the identification code appearing on the display for the desired application (magazine). When that key is pressed, the INDEX subroutine of the basic terminal transfers program control from the basic terminal to the selected module.

The module program first called a MAGAZINE INITIALIZATION subprogram which sets the interrupts to be allowed, causes the display to be erased as before, intializes the keyboard and checks for the communication module among other things.

After INITIALIZATION, the program calls a MODULE INDEX subroutine. This subroutine calls the DISPLAY subroutine from the basic terminal which then displays the available module functions and asks the user to select a function. For example, display of the magazine module index may be as follows:

| MAGAZINE MODULE INDEX | |
|---|---|
| CODE | APPLICATION |
| 1 | LIST CURRENT SUBSCRIPTIONS |
| 2 | CALL FOR AVAILABLE PUBLICATIONS |
| 3 | CALL FOR MAGAZINE DATA |
| 4 | CALL TO LOAD NEW SUBSCRIPTION |
| 5 | CALL TO DELETE A SUBSCRIPTION |
| PRESS ONE OF THE ABOVE CODES | |
| DISPLAY NO. 2 | |
| (Magazine Module Index) | |

Data for displaying the module index is stored within the ROM 44 of the module 42 and is fed directly from the module 42 to the display buffer 36, bypassing the display RAM 34.

The available functions of the magazine module as shown in Display No. 2 are generally self-explanatory, but each is described in further detail below for the sake of completeness.

For the purpose of this explanation, it is assumed that the user wishes to know what publications are available and, therefore, key No. 2 (corresponding to the second listed function "call for available publications") is depressed on the keyboard. This then causes the module program to display the following message.

| CALL FOR AVAILABLE PUBLICATIONS |
|---|
| THE NUMBER TO BE DIALED IS: |
| 123-4567 |
| IF THE PHONE NUMBER IS CORRECT PRESS "RETURN" TO START DIALING. TO CHANGE THE PHONE NUMBER, PRESS "C". |
| DISPLAY NO. 3 |

The phone number may be provided with the application module when delivered by the manufacturer and, for example, may be the phone number of a barge-in line 24 on which is circulated a closed loop file listing all magazines which are available to subscribers. To call the data bank to obtain this information, the user presses the digits corresponding to the displayed phone number followed by the key marked RETURN. This key transfers program control to a DIAL subroutine stored in the communications module which then dials the selected phone number and returns to the application module program when the number has been dialed and the telephone line is connected to the subscriber's terminal.

Figure 3:
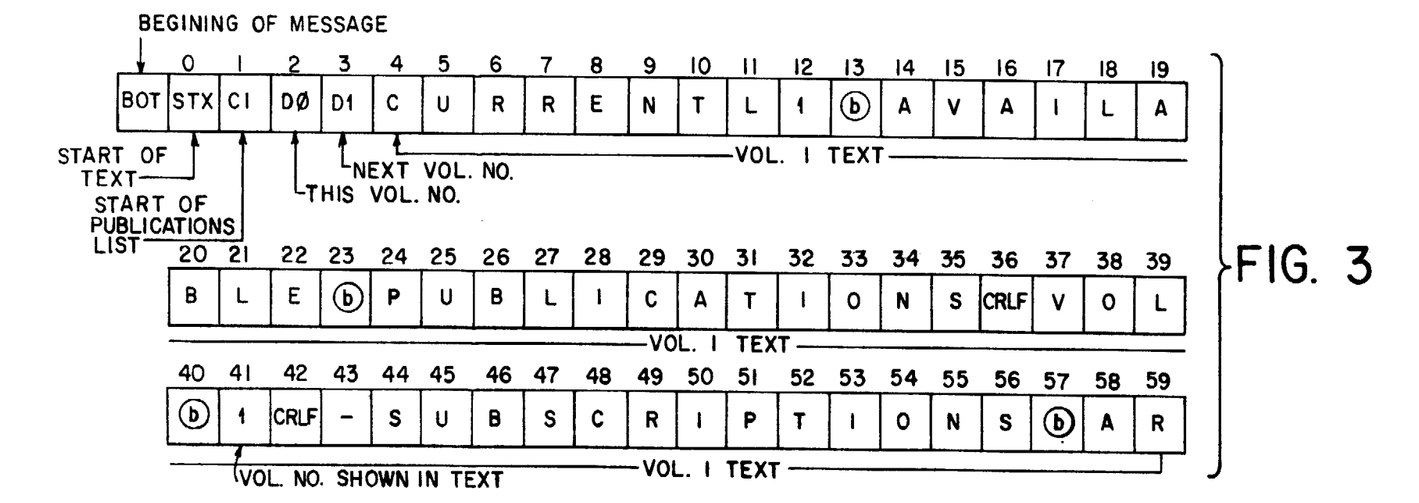
FIGS. 3, 4 and 5 show the formats of different types of data applied by the data bank to the barge-in lines.
Figure 4:
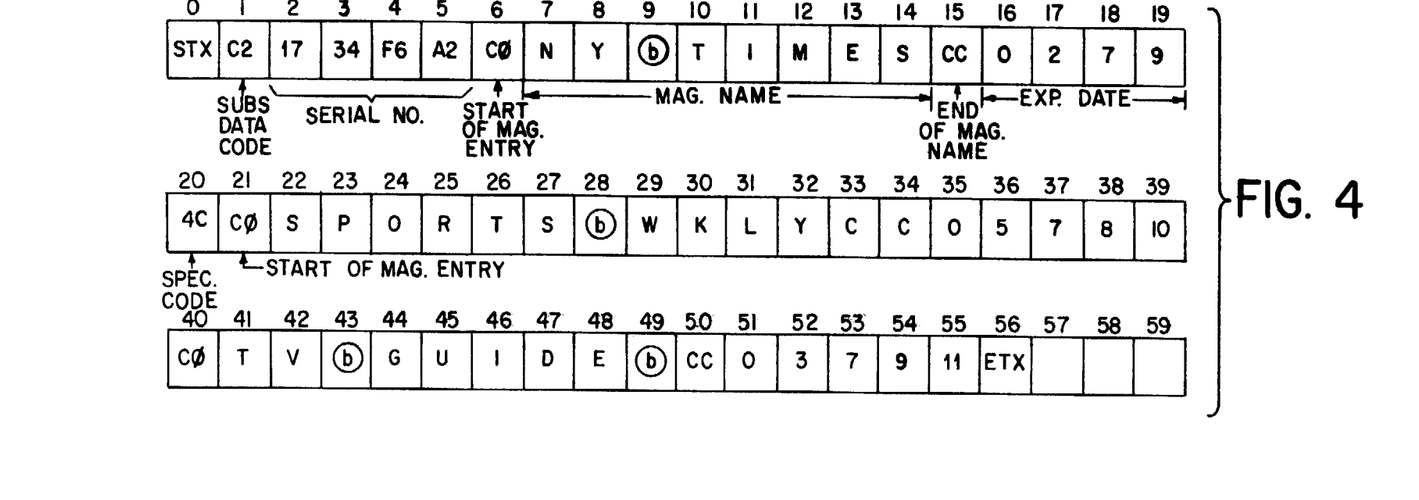
Figure 5:
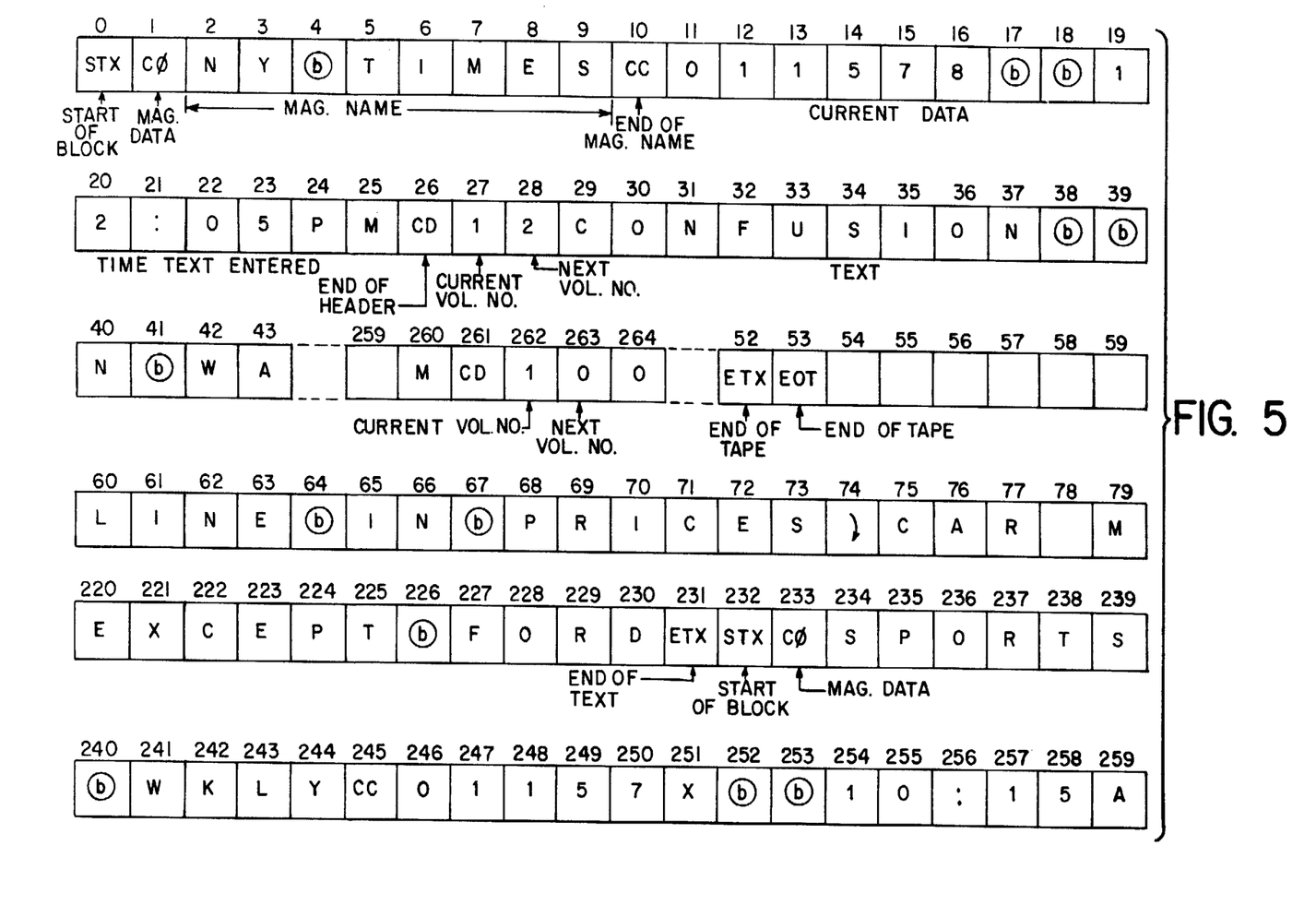

The format of the data which appears on the barge-in telephone lines is represented in FIGS. 3, 4 and 5. The list of available publications is shown in FIG. 3 which shows that a BOT signal (beginning of tape) is followed by a start of text signal (STX) and then a start of publications list signal (Cl). When these characters have appeared in the proper sequence, the incoming data on the telephone line is then coupled directly into the display RAM 34. In the example under consideration, this may result in the following display:

| CURRENTLY AVAILABLE PUBLICATIONS FOR THE ALPEX A900-1/9/78 | |
|---|---|
| SUBSCRIPTIONS ARE FOR 1 YEAR UNLESS OTHERWISE NOTED IF AN ASTERISK (*) PRESENT SEND CHECK TO: ALPEX SUBSCRIPTIONS COMMERCE PARK DANBURY, CT. 06810 | |
| SPORTS WEEKLY | $140 |
| WALL STREET JOURNAL | 65 |
| TIME MAGAZINE (*) | 35 |
| STOCK SUMMARY | 175 |
| NY TIMES SUMMARY (*) | 60 |
| TV GUIDE | 75 |
| PRESS NEXT PAGE KEY FOR ADDITIONAL SUBSCRIPTIONS | |
| DISPLAY NO. 4 | |
| (List of Available Publications) | |

At this stage, the user is now aware of the publications to which he can subscribe. Assuming, for further purposes of the example, that the user elects to subscribe to "Sports Weekly", "New York Times Summary" and "TV Guide", he writes to the vendor (i.e., the data bank) advising it accordingly. The data bank may then place subscription data on a subscription barge-in line 24S in the form of a closed loop file. The format of the subscription data is shown in FIG. 4, and includes the identifying serial number of the subscriber, the magazines to which he has subscribed and, as to each magazine, the expiration date of his subscription. The user is next advised (e.g., by mail) that his terminal is prepared to receive subscription data which, as explained above, requires that appropriate data be transferred from the data base into the EAROM 46 of the magazine module.

When the user is ready to complete the subscription, he returns to the initial magazine module index (Display No. 2) and selects code 4 ("call to load new subscription"). This will cause a display (not shown) instructing the user to dial the indicated subscription telephone line as described previously. As the subscription data (see FIG. 4) flows into the terminal, each serial number on the subscription line is compared with the serial number of the subscriber (stored within each module EAROM). When the serial number compares, the subscription data, including the magazine name and expiration date, is then transferred into the module EAROM.

As part of this procedure, the module program may display the list of magazines being added to the list of subscriptions and, when the search is completed, a complete list of the updated "current subscriptions" so that the user can check to see that the correct entries have been made.

At this stage, the subscriber is now prepared to receive the magazine text data for the magazines to which he has subscribed. For this purpose, he again returns to the initial magazine module index (Display No. 2) and presses code 3 ("call for magazine data").

The application module program first goes through the initialization procedures. It then calls the DISPLAY subroutine and displays the subscription data which has been held in the module EAROM together with instructions for selecting the desired magazine. A typical display of the available magazines is shown below.

| | MAGAZINE | PGS | PHONE NUMBER |
|---|---|---|---|
| 1 | NY TIMES | | |
| 2 | SPORTS WKLY | 2 | 9-1-123-456-7890 |
| 3 | TV GUIDE | | 212-775-1212 |
| | ENTER THE CODE(S) (MAX OF 3) OF THE PUBLICATIONS YOU WISH TO VIEW (EXAMPLE 1, 10, 6) THEN PRESS "RETURN" | | |
| | DISPLAY NO. 5 (Available Magazine Data) | | |

Display No. 4 indicates that there are three available magazines, two of which have indicated phone numbers, which contain the subscription data sought. Assuming that the user wishes to select the New York Times (which includes no phone number) he depresses the key 1 and presses the RETURN button.

The module program then searches for a phone number in the module EAROM. In this case, no phone number is present (if the magazine had previously been selected, the phone number would already be stored in EAROM). Accordingly, the program displays a message (not shown) instructing the user to enter the phone number for the selected magazine (the subscriber is notified of the phone numbers for his subscriptions when originally instructed on the subscription procedures).

After the user has entered the telephone number as described previously, the phone number is stored in the module EAROM by calling a "CALL RIGHT BLOCK" subroutine from the basic terminal program. Next, the message "READY TO DIAL?" may be displayed so that when the user pushes the DIAL key, the terminal will dial the selected telephone number and connect the basic terminal with the selected magazine data barge-in telephone line 24T.

The format of the magazine data appearing on the text barge-in line is shown in FIG. 5. This data includes the name of the magazine, the current date (i.e., the date of data transmission), the time the text was entered in the data bank, the volume numbers on which the text appears, and the text.

It is not required that an entire magazine be displayed on a television receiver. Each closed loop file (for the text material) may include approximately 612 characters (see FIG. 5). In many cases, the entire text will occupy a single page although, of course, more than one page may be required. It is contemplated that the material stored by the various publications in the data bank will be in summary form rather than in the form of the complete text. For example, in the case of The New York Times, the entire newspaper would not be stored in the data bank. Instead, a brief summary of the news would be held in the data bank so that a subscriber terminal would receive only a brief and useful synopsis of the day's news.

Figure 6:
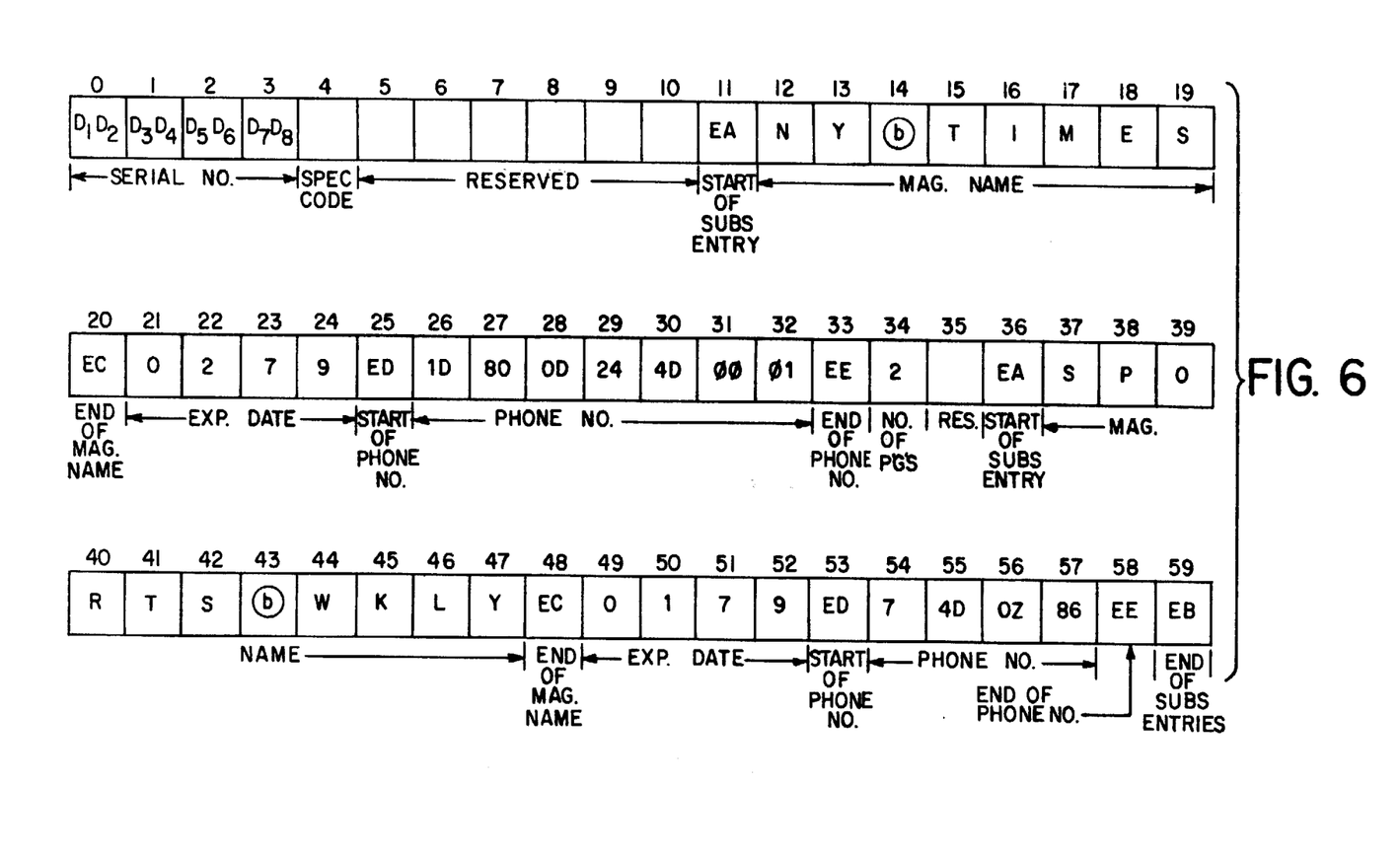
FIG. 6 shows the format of the data stored in the electrically alterable read only memory of an application module.

The format of the data which is stored in the module EAROM is shown in FIG. 6. The data in FIG. 6 is stored after the user has subscribed to the selected magazines as described above and after the appropriate telephone numbers have been entered.

After the selected telephone number has been called and the terminal connected through the communications module, the module program searches for the selected magazine. Since the user is calling a barge-in system, there will only be a nominal delay in connecting to the telephone line, although some delay will normally be encountered before the selected subscription appears on the line. For example, if the selected magazine data is recirculated every minute, on the average, the subscriber will have to wait thirty seconds before the text he seeks appears on the line.

Typically, there may be 612 characters for each page of information to be displayed (including supplemental characters used to generate background color). About 120 characters may be transmitted each second so that approximately five seconds are required to transmit each page. It is further contemplated that if twelve pages of data appear on each closed loop file, slightly more than sixty seconds will normally be required to circulate an entire file. Hence, under the worst of conditions, a subscriber would have to wait nomore than about one minute after the telephone connection is made to receive the text data.

As the data is fed to the terminal, the module program searches for the selected magazine name. When the data is found, the expiration date (stored in the module EAROM) is compared with the current date (FIG. 5). If the expiration date is later, the microprocessor 30 couples the subsequent text into the display RAM 34. If the subscription has expired, the program may cause the message "subscription expired" to be displayed.

When the signal indicating the end of the subscription is received, the module program causes the communication module to disconnect the basic terminal from the telephone line.

At this point, there will typically be three pages of data stored in the display RAM 34. The content of the display RAM corresponding to page 1 are coupled to the display buffer 36 and, therefore, only that data is displayed. The user may depress a SCROLL button to transfer continuous data lines from page 2 (and 3) into the display buffer thereby, in effect, permitting the user to "scroll" through the contents of the display RAM.

The foregoing outlines generally the steps involved for one particular application in first subscribing to the data bank and then receiving the selected text. Other options will also be provided. For example, referring again to Display No. 2, if the user presses the INDEX button to return to the magazine module index, he may press key No. 1 to obtain a list of the current subscriptions. The display provided in this case may be as follows:

| CURRENT SUBSCRIPTIONS | | |
|---|---|---|
| MAGAZINE | EXP DATE | # PAGES |
| COMMOD RPT | 2/79 | 2 |
| EXECUT RPT | 6/79 | 2 |
| JONES RPT A | 11/78 | 1 |
| NY TIMES | 3/78 | 3 |
| STOCK SUM | 2/79 | 2 |
| SMITH RPT B | 3/78 | 2 |
| PRESS "INDEX" TO RETURN TO INDEX | | |
| DISPLAY NO. 6 | | |
| (List of Current Subscriptions) | | |

If a user wishes to delete a subscription, key No. 5 will initiate a function similar to "call to load new subscription". The sixth function ("store phone number for a subscription") provides the ability to change telephone numbers should that become necessary or desirable. There may be additional functions to enable the user to store the information received on a tape cassette for subsequent retrieval. When it is desired to record and/or replay the subscription data, it is necessary to plug into the base terminal the appropriate communication module which will permit interfacing with the recording equipment.

Figure 7:
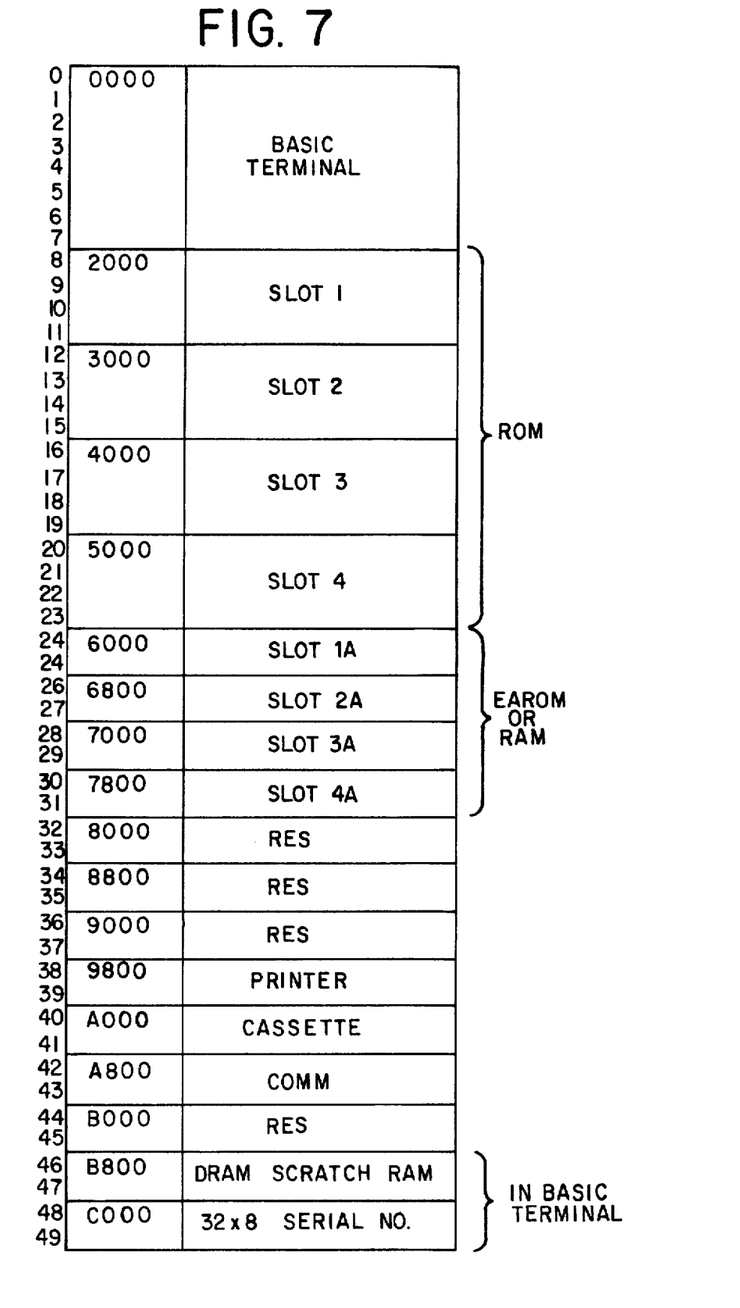
FIG. 7 is a memory map for a preferred embodiment of the invention.

FIG. 7 is a memory map of a terminal according to a preferred embodiment, including the basic terminal and the various modules, both application and communication. Each block includes 1024 bytes and the starting addresses are expressed in hexadecimal. Blocks 8 through 45 represent memory within the various modules as indicated. Slots 1, 2, 3 and 4 represent the ROM of different application modules and slots 1A through 4A are the EAROM (or RAM) of the corresponding application module.

The individual blocks of FIGS. 1 and 2 are known. The data bank 20 may, for example, comprise The New York Times data base, and the information may be stored in an IBM 370. The block labeled "Telephone Company" can be an existing telephone system. Block 26 (MCU) may be a multiple calling unit, or barge-in system as it is also known, of the type supplied by the Southern New England Telephone Company. Of course, the television receivers 12a–12n may be conventional receivers.

Referring to FIG. 2, the RAM's 32a, 44 and 50 may comprise National Semi-conductor part No. MM52132. The EAROM 46 may comprise General Instrument part No. ER3400. The RAM 32b, display RAM 34 and display buffer 36 may each comprise industry part No. 2114L of the type, for example, manufactured and sold by Fairchild Camera and Instrument Corp. Character generator 38 may also comprise a ROM such as National Semi-conductor part No. MM52132 in which a dot pattern is generated in response to an incoming ASCII code.

The television interface 40 is not actually a single part but such devices are conventional. For example, the block 40 shown in FIG. 2 may comprise the television interface circuit 36 described in U.S. Pat. No. 4,026,555.

For purposes of explanation only, the preferred embodiment of the invention has been described in connection with a magazine subscription service. Of course, the invention is not restricted to any type of information and it is contemplated that the data bank may provide "data" quite different from the data now provided by data banks. As one further example, the "data" provided may be used to play sophisticated games (e.g. checkers and chess) or games of the type now sold as video games. Hence, as used herein the term "data bank" is intended to include any source of information regardless of the purposes for which such information is to be used so long as such information can be transmitted on telephone lines. The term "text data" refers to the information supplied by the data banks and "subscription data" broadly includes any identifying code for the text data to be received so long as it can be used to indicate that a terminal has completed a subscription procedure and is entitled to receive the text data from the data bank.

The computer programs required to execute the "magazine module" application are annexed hereto as Appendices I, II and III. Appendix I is the program for the basic terminal; Appendix II is the program for the magazine module; and Appendix III is the program for the communication module. The programs are written in the microprocessor assembly language for the Intel 8080 microprocessor.

What is claimed is:

1. A data retrieval system for enabling subscribers to retrieve and display selected text data, comprising in combination a data bank, a plurality of text barge-in telephone lines on which text data from said data bank is circulated, said text data including text identifying signals, a subscription barge-in telephone line on which subscription data for a multiplicity of subscribers is circulated, said subscription data identifying subscriber terminals which have subscribed to the text data and the text data to which they have subscribed, and a multiplicity of subscriber terminals, each of which includes data processor means, memory means and display means, said data processor means under control of instructions stored in said memory means determining the information to be displayed by said display means, each one of said subscriber terminals further including means for transferring subscription data for said one subscriber terminal only from said subscription barge-in telephone line to a first portion of said memory means, means for comparing selected text identifying signals on at least one of said text barge-in telephone lines and said subscription data; and means for selectively causing the text data on said one text barge-in telephone line to be displayed when said means for comparing indicates that said one subscriber terminal has subscribed thereto.

2. A data retrieval system according to claim 1, wherein each subscriber terminal comprises a basic terminal including said data processor and a second portion of said memory means in which are stored program instructions for controlling the display, at least one application module physically and electrically detachable from said basic terminal and including a third portion of said memory means having stored therein program instructions defining the function of the terminal, and a communications module for connecting said terminal to any of said text and subscription barge-in telephone lines.

3. A data retrieval system according to claim 2, wherein said first portion of said memory means which stores the subscription data appearing on said subscription barge-in line comprises an EAROM.

4. A data retrieval system according to claim 3, wherein each of said basic terminals has a unique identifier code permanently stored in a fourth portion of said memory means, said subscription data identifying the terminals which have subscribed to the text data by said identifier codes.

5. A data retrieval system according to claim 1 or 2, wherein in a special text barge-in telephone line data identifying the services available for subscription is circulated, and wherein each of said subscriber terminals further includes means for causing the data appearing on said special text barge-in telephone line to be displayed by said display means.

6. For use in a data retrieval system which includes a plurality of text barge-in telephone lines on which text data from a data bank is circulated, a subscriber terminal capable of serving a plurality of preselected separate basic operating functions, comprising display means, data processor means, memory means having stored therein program instructions for operating such data processor means, said program instructions including display instructions for controlling said display means and operating instructions for controlling the basic operating function of the terminal, said display means displaying text data under control of said display instructions and said data processor means, means for transferring preselected subscription data to a first portion of said memory means, means for comparing the stored subscription data in said memory means with identifier signals accompanying said text data to provide an indication whether the terminal has subscribed to said text data, and means for selectively causing the text data on at least one of said text barge-in telephone lines to be displayed when said comparing means indicates that the terminal has subscribed to said text data.

7. A subscriber terminal according to claim 6, wherein said subscriber terminal comprises a basic terminal including said data processor means and a second portion of said memory means in which are stored said display instructions, at least one application module physically and electrically detachable from said basic terminal and including a third portion of said memory means having stored therein said operating instructions, and a communications module for connecting said terminal to any of said barge-in telephone lines.

8. A subscriber terminal according to claim 7 wherein the first portion of said memory means comprises an EAROM.

9. A subscriber terminal according to claim 8, wherein said basic terminal has a unique identifier code permanently stored in said memory means, said subscription data including the identifier codes of selected subscriber terminals and text identifying signals.

10. A method of retrieving data from a data bank wherein the retrieved data is transmitted via telephone lines and displayed at a terminal, comprising calling from a terminal a subscription barge-in telephone line on which subscription data from said data bank for a multiplicity of subscribers is circulated, storing at said terminal the subscription data corresponding to that terminal that is circulated on said subscription barge-in telephone line, thereafter calling from said terminal a text barge-in telephone line on which text data from said data bank is circulated, comparing an identifying code accompanying the text data appearing on said text barge-in telephone line with the subscription data stored in the terminal, and displaying said text data when the aforesaid comparison indicates that there is a predetermined correlation between said identifying code and said stored subscription data signifying that said terminal has subscribed to said text data.

* * * * *